United States Patent
Raughley (10) Patent No.: US 7,253,382 B2
(45) Date of Patent: Aug. 7, 2007

(54) CONTAINER FOR PREPARING A COMESTIBLE ARTICLE IN MICROWAVE OVEN, AND A SELF-CONTAINED COMESTIBLE ARTICLE UTILIZING THE SAME

(75) Inventor: Kurt Douglas Raughley, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/568,335

(22) PCT Filed: Oct. 1, 2004

(86) PCT No.: PCT/US2004/032629

§ 371 (c)(1),
(2), (4) Date: Feb. 13, 2006

(87) PCT Pub. No.: WO2005/034581

PCT Pub. Date: Apr. 14, 2005

(65) Prior Publication Data

US 2006/0289513 A1    Dec. 28, 2006

(51) Int. Cl.
*H05B 6/80* (2006.01)
*B65D 85/00* (2006.01)

(52) U.S. Cl. .................. 219/727; 219/729; 219/732; 219/763; 99/DIG. 14; 426/234

(58) Field of Classification Search ............... 219/727, 219/729, 732, 763; 99/DIG. 14; 426/234, 426/241, 113, 115, 118, 243; 229/101, 108.1, 229/125.35
See application file for complete search history.

(56) References Cited

U.S. PATENT DOCUMENTS

| | | | | |
|---|---|---|---|---|
| 4,036,423 A | * | 7/1977 | Gordon | 229/125.34 |
| 4,038,425 A | * | 7/1977 | Brandberg et al. | 426/107 |
| 4,973,810 A | * | 11/1990 | Brauner | 219/727 |
| 5,071,662 A | * | 12/1991 | Dysarz | 426/113 |

\* cited by examiner

*Primary Examiner*—Philip H. Leung

(57) ABSTRACT

A container (10) for preparing a comestible article in a microwave oven includes a storage chamber (18) into which a comestible article (c) cooked by exposure to microwave energy is displaced, the storage chamber (18) being characterized by the presence of a microwave shielding material (28) disposed therearound.

11 Claims, 12 Drawing Sheets

CONTAINER FOR PREPARING A COMESTIBLE ARTICLE IN MICROWAVE OVEN, AND A SELF-CONTAINED COMESTIBLE ARTICLE UTILIZING THE SAME

BACKGROUND OF THE INVENTION

1. Field of the Invention

This invention relates to a container for cooking a comestible material, such as popcorn, in a microwave oven and a self-contained comestible article utilizing the same.

2. Description of Related Art

Popcorn is a popular snack food that traditionally is prepared by heating a covered pan containing popping corn and an amount of edible oil over a thermal heat source. With the advent of the microwave oven numerous packages or methods for preparing popcorn in that device are commercially available. Such packages typically have a measured quantity of popcorn kernels and a shortening or butter substitute, such as a partially hydrogenated edible oil, positioned on a microwave susceptor material. These packages are capable of cooking the majority of the initial charge of kernels but leave a few unpopped kernels. The edible oil provides flavoring for the popcorn similar to the flavor of melted butter. The edible oil conducts heat from the susceptor to the kernels and, when melted, also acts as a microwave susceptor. Some of the edible oil remains on the popped kernels and continues to be heated by the microwave energy. This may cause a change in taste and actual scorching or burning if the microwave heating continues for a sufficient time.

In view of a the foregoing it is believed advantageous to provide a container that serves to protect first-cooked comestibles from continued exposure to microwave energy.

SUMMARY OF THE INVENTION

In one aspect this invention is directed to a disposable or reusable container for preparing a comestible material in a microwave oven. The container includes a first portion defining a preparation chamber and a second portion that defines a storage chamber. At least the portion of the container defining the preparation chamber is transparent to microwave energy.

In accordance with the invention the improvement comprises the storage chamber portion of the container having a microwave shielding material disposed therearound, such that, as a comestible material initially disposed within the preparation chamber is cooked by exposure to microwave energy the comestible material displaces from the preparation chamber into the storage chamber whereat the comestible material is shielded from further exposure to microwave energy by the microwave shielding material.

In the disposable container embodiment the second portion is expandable to define the storage chamber. In the reusable container embodiment the preparation chamber is removable from the storage chamber. In addition a diverter may be provided in the storage chamber.

BRIEF DESCRIPTION OF THE FIGURES

The invention will be more fully understood from the following detailed description taken in connection with the accompanying drawings which form a part of this application and in which:

FIGS. 4A and 4B illustrate yet another modified version of the disposable container of FIGS. 1A, 1B before and after exposure of the comestible material to microwave energy, respectively, while

DETAILED DESCRIPTION OF THE INVENTION

Throughout the following detailed description similar reference characters refer to similar elements in all figures of the drawings.

Figure 1A:
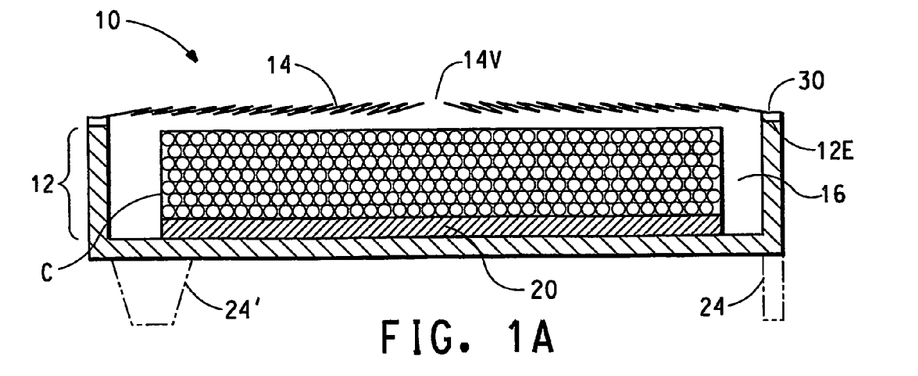
FIGS. 1A and 1B are side elevational views entirely in section of a disposable container for preparing a comestible material in a microwave oven in accordance with the present invention before and after exposure of the comestible material to microwave energy, respectively.
Figure 1B:
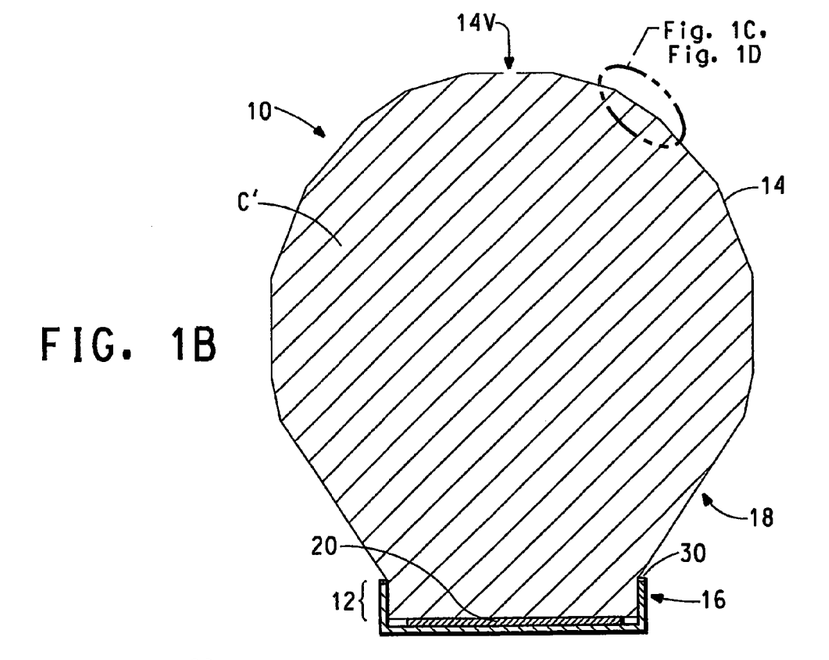

With reference to FIGS. 1A and 1B shown is a disposable container generally indicated by the reference character 10 for preparing a comestible material indicated by the reference C in a microwave oven. FIG. 1A illustrates the container 10 in its on-the-shelf configuration while FIG. 1B illustrates the configuration of the container 10 after exposure of the comestible material to microwave energy and prior to opening. An optional outer protective wrapping (not shown) may surround the container 10, if desired. In the preferred usage of the present invention the comestible material C is kernels of popping corn in an edible oil, such as partially hydrogenated vegetable oil.

The container 10 includes a first portion 12 and a second, expandable, portion 14. The first portion 12 defines a preparation chamber 16 in which the comestible material C is disposed. The comestible material C may be positioned on an optional layer of a microwave susceptor 20. Any suitable susceptor 20 may be used. The susceptor sold by E. I. du Pont de Nemours and Company, Wilmington, Del., under the trademark Mylar OL® has been found suitable.

The second portion 14 of the container, when expanded, defines a storage chamber 18 (FIG. 1B) in which the cooked comestible material is held. An optional support base 24 may be provided on the bottom of the container 10 to elevate the susceptor material 20 above the bottom wall of the microwave oven. The support base 24 (if used) may be implemented in any convenient fashion such as shown by 24, 24'.

At least the first portion 12 of the container 10 is fabricated from a material that is substantially transparent to microwave energy. A suitable material such as paper, paper board, or a paper board-polymer laminate, such as a paper board-polyester terephthalate (PET)laminate, or other material having sufficient thermal stability at cooking temperatures, may be used.

Figure 1C:
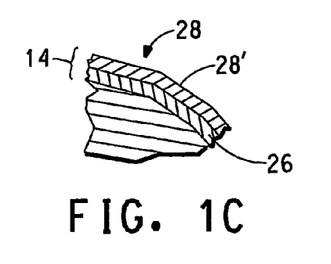
FIG. 1C is an enlarged view of a portion of the disposable container of FIG. 1A showing a first alternative microwave shielding material.
Figure 1D:
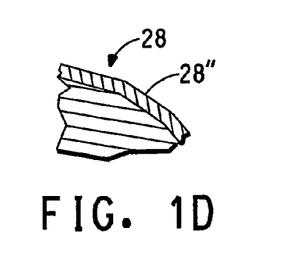
FIG. 1D is an enlarged view of a portion of the disposable container of FIG. 1A showing a second alternative microwave shielding material.

In accordance with the present invention the expandable portion 14 of the container 10 that forms the storage chamber 18 is fabricated from or has a microwave shielding material 28 disposed thereon. A preferred shielding material for the expandable portion 14 is an aluminum-coated polyester terephthalate (PET). As shown in FIG. 1C, the aluminum coating 28' may be disposed on the exterior (or interior) of a support layer 26 of the expandable portion 14. As seen in FIG. 1D, a thin sheet of aluminum foil 28" may alternately be used. The expandable portion 14 of the container 10 is folded so that in the on-the-shelf configuration (FIG. 1A) it closely overlies the preparation chamber 16 and the comestible material C therein. The expandable portion 14 of the container 10 is attached on or in the vicinity of the upper edge 12E of the first portion 12 using a suitable adhesive 30. A vent 14V, such as a small hole in the expandable portion 14, may be provided to allow excess water vapor to escape after exposure of the comestible material to microwave energy.

In use, the container 10 is introduced into a microwave oven and the oven is activated. As the comestible material C within the preparation chamber 16 is cooked by exposure to microwave energy it increases in volume and displaces from the preparation chamber 16. The expandable portion 14 of the container 10 responds to the increase in volume and displacement of the cooked comestible material, indicated by the reference character C', by unfolding to define the expandable storage chamber 18. The cooked comestible material C' (FIG. 1B) that displaces into the storage chamber 18 is shielded from further exposure to microwave energy by the microwave shielding material 28.

The container of the present invention is believed advantageous because without the presence of the microwave shielding material 28 surrounding the storage chamber 18, kernels that "pop" early in the cooking cycle would continue to be heated by microwave energy. Without the protection afforded by the microwave shielding material 28, continued heating would tend to scorch the first-"popped" kernels.

Figure 2A:
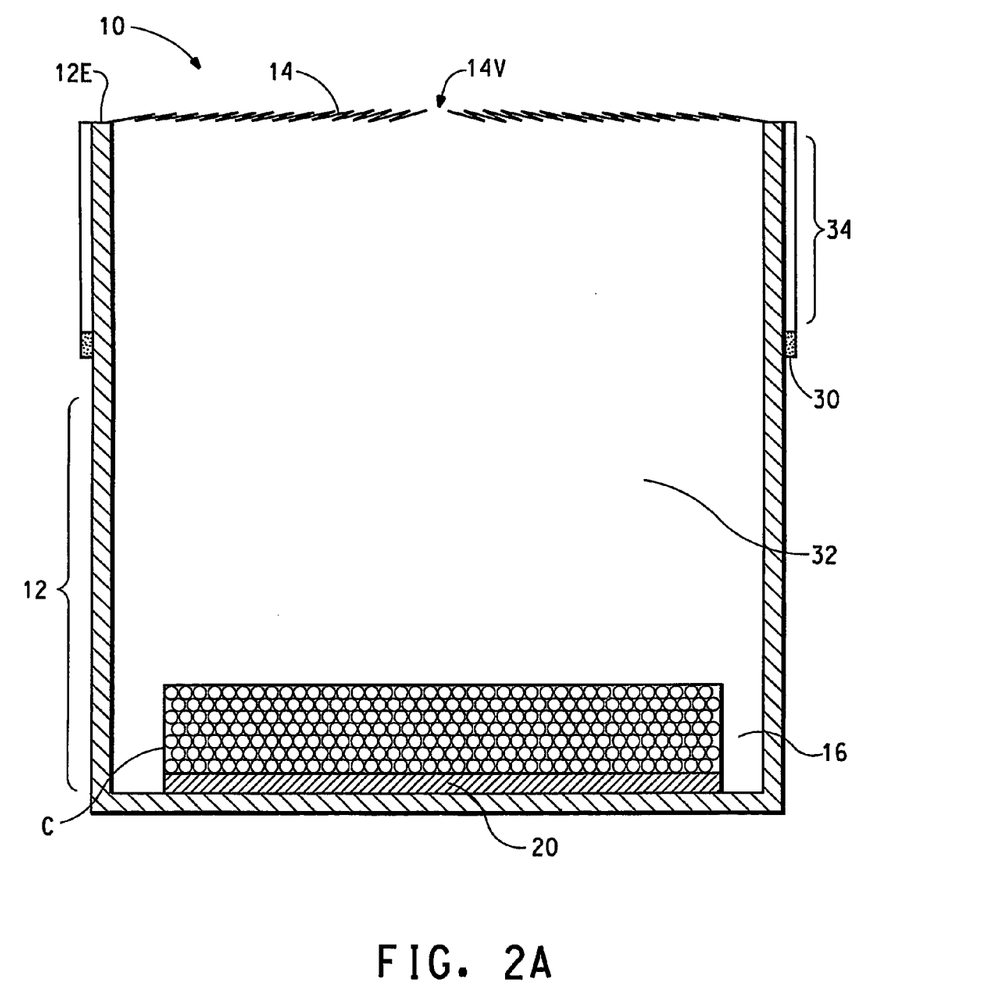
FIGS. 2A and 2B illustrate a modified version of the disposable container of FIGS. 1A, 1B before and after exposure of the comestible material to microwave energy, respectively.
Figure 2B:
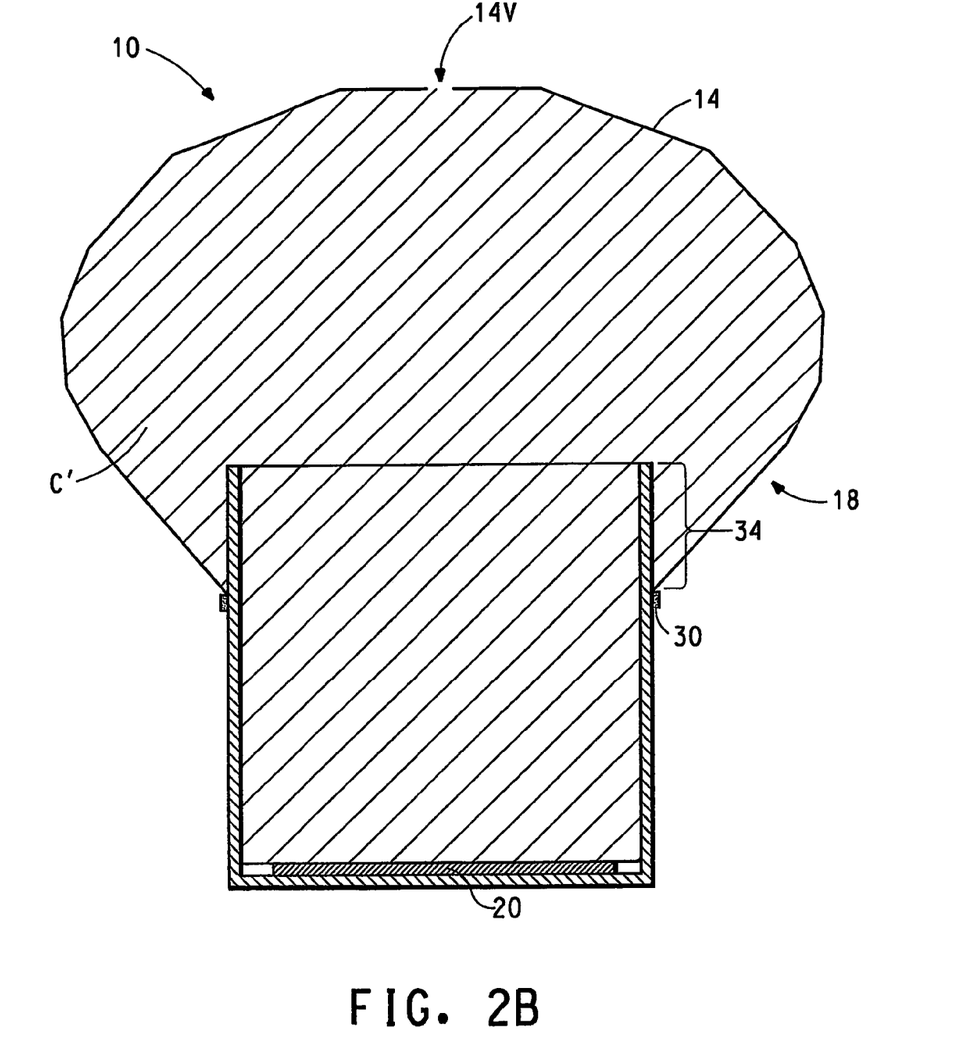

FIGS. 2A and 2B show a modified version of the disposable container 10 in which the first portion 12 is extended both to enlarge the preparation chamber 16 and to define a hollow conduit 32 that connects the preparation chamber 16 to the storage chamber 18. In use, the earliest-cooked kernels accumulate within the enlarged preparation chamber 16. These kernels are sequentially displaced by later-cooked kernels from the preparation chamber 16 into contact with the expandable portion 14, causing the same to enlarge to form the storage chamber 18.

Depending upon the location of the adhesive attachment 30 between the expandable portion 14 and the first portion 12 of the container some of the microwave shielding material may be disposed around a region of the hollow conduit 32. This region of the conduit 32 may also afford protection to cooked kernels from continued exposure to microwave energy. This relationship is made clear in FIG. 2B where the upper region of the conduit 32 projects into the storage chamber 18. This projecting portion 34 of the conduit 32 serves as a barrier that retains comestible material cooked by exposure to microwave energy within the storage chamber 18.

Figure 3A:
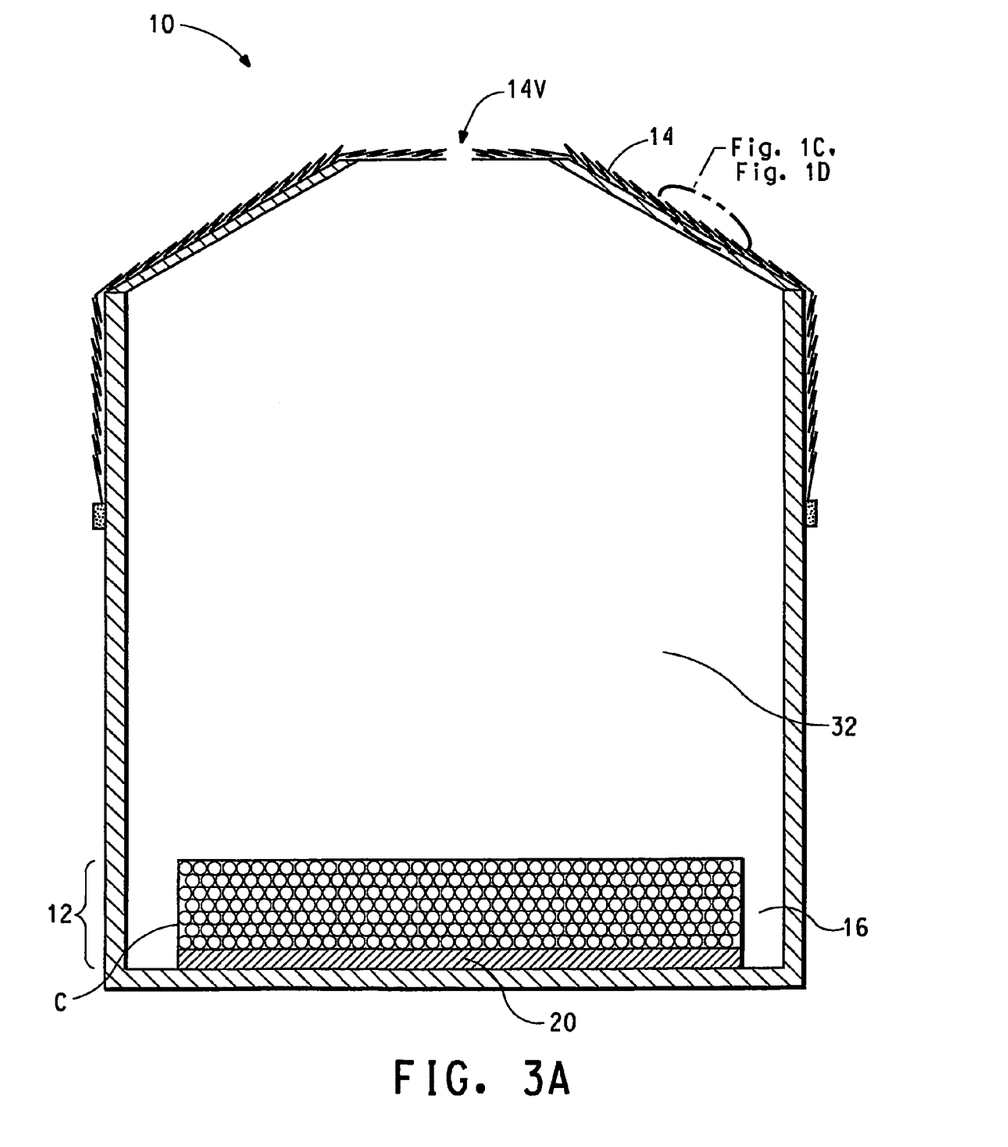
FIGS. 3A and 3B illustrate another modified version of the disposable container of FIGS. 1A, 1B before and after exposure of the comestible material to microwave energy, respectively.
Figure 3B:
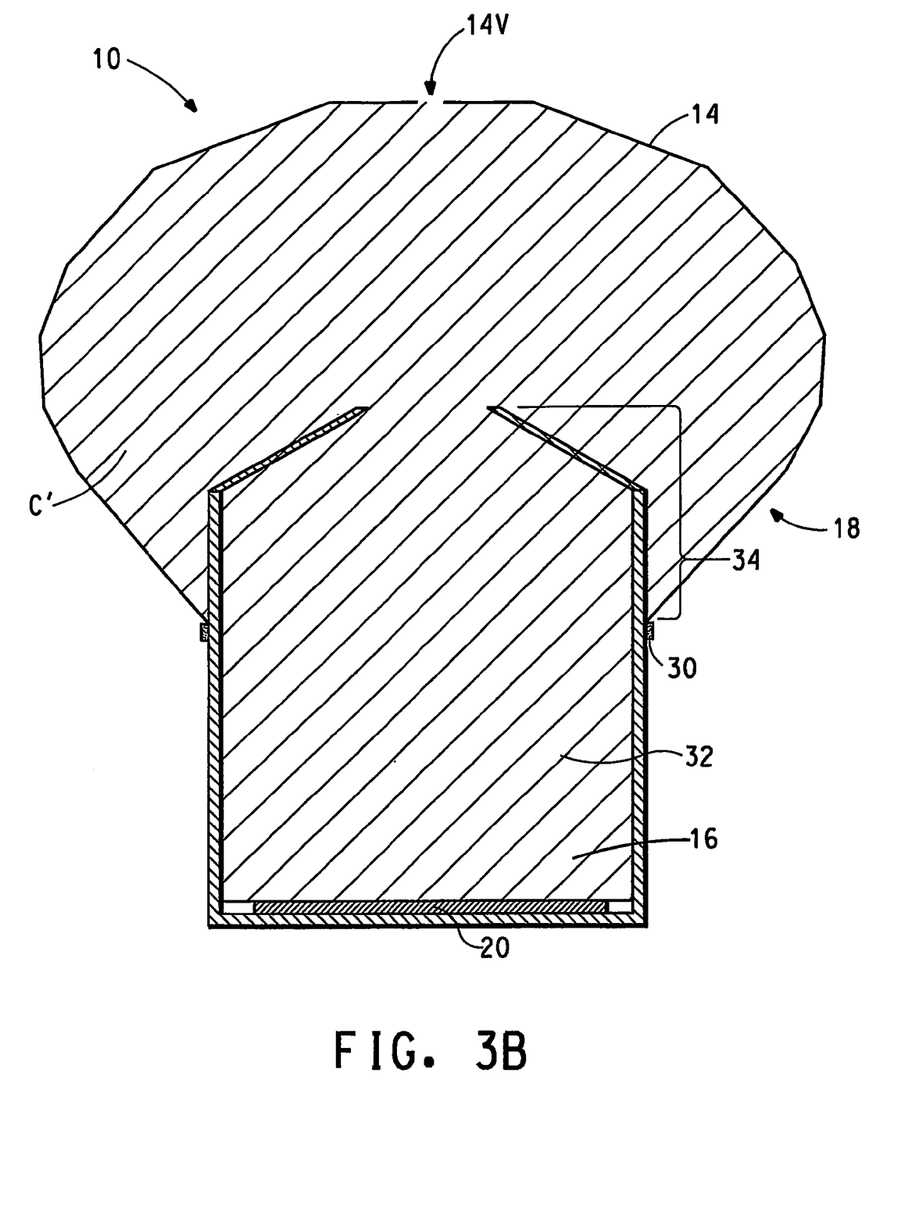

A further alternative modification to the container 10 is illustrated in FIGS. 3A and 3B. In this arrangement the projecting portion 34 of the conduit 32 is configured to prevent the entry of substantially all microwave energy into the storage chamber 18. In the arrangement shown the projecting portion 34 tapers from the preparation chamber toward the storage chamber 18.

Figure 4A:
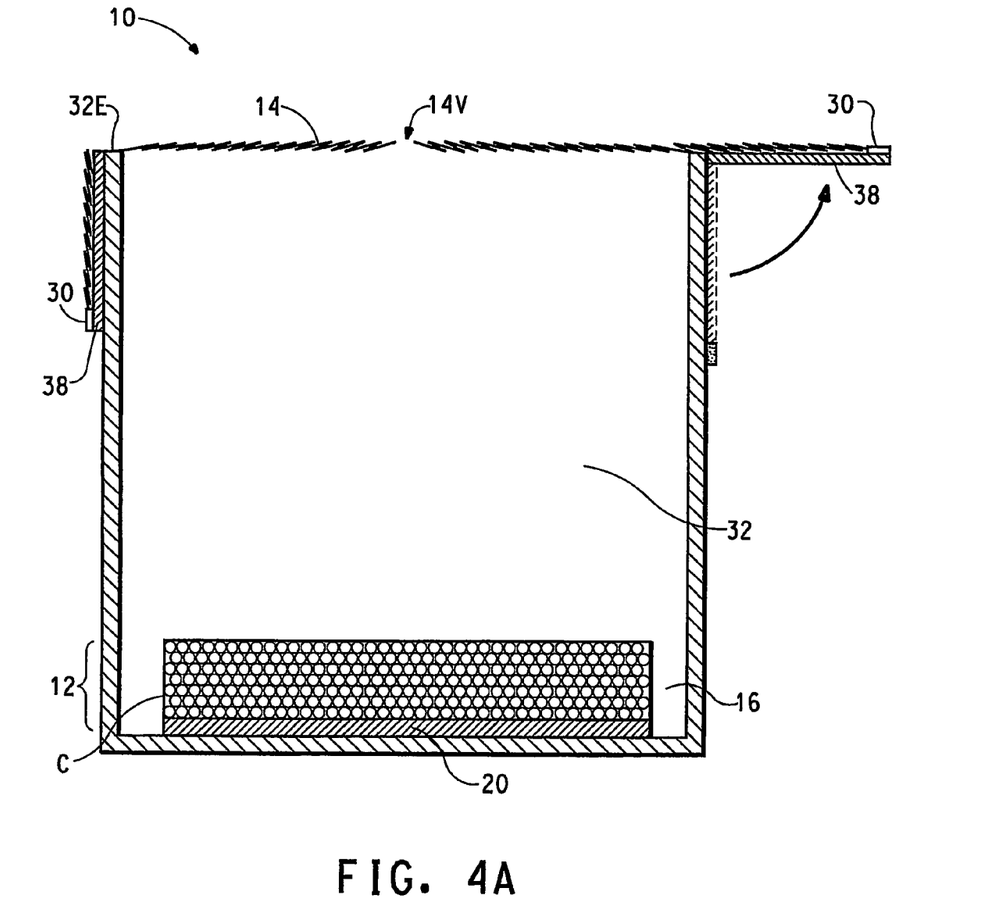
Figure 4B:
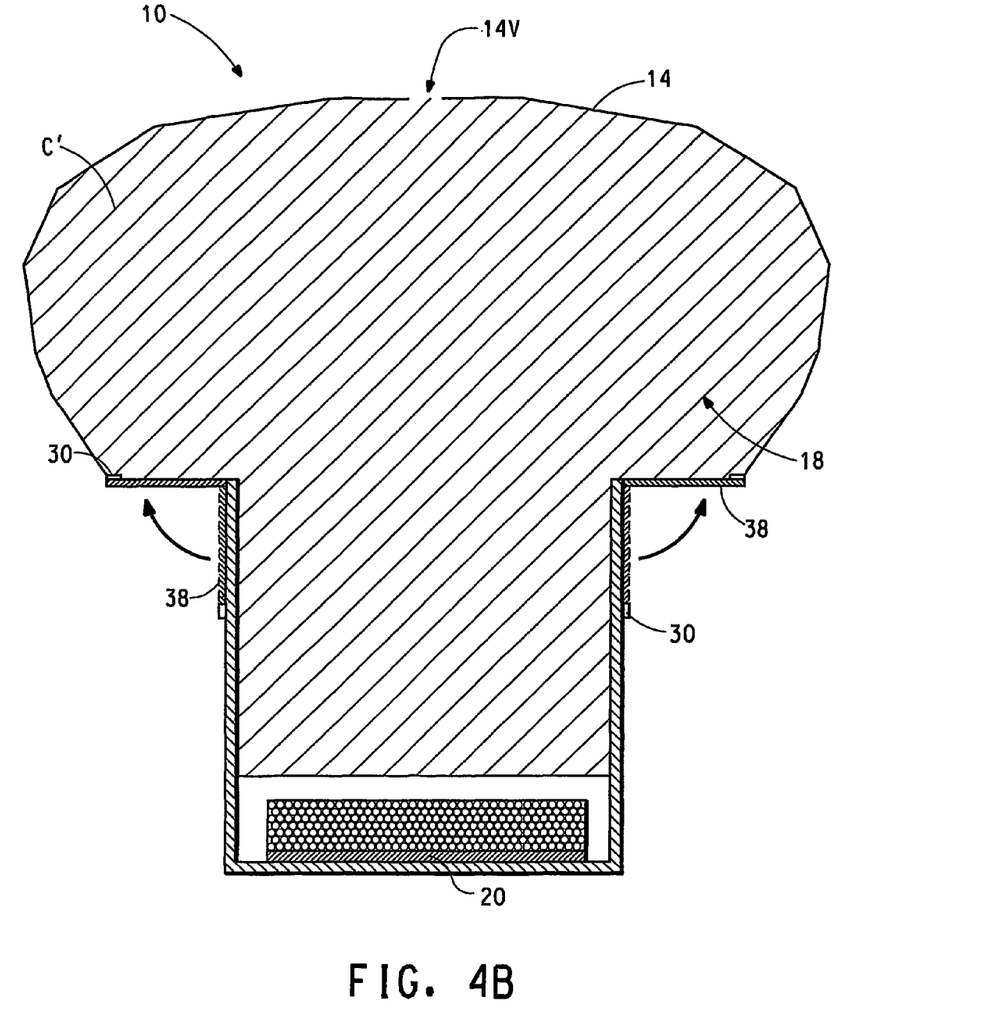

Yet another modification to the container 10 is illustrated in FIGS. 4A and 4B. In this arrangement a collapsible annular shelf 38 is attached to the upper edge 32E of the conduit 32. The left hand portion of FIG. 4A illustrates the shelf 38 in the collapsed configuration, while the right hand portion of that Figure illustrates the shelf 38 in the extended configuration. The expandable portion 14 of the container 10 is adhered near the perimeter of the shelf 38 by a suitable adhesive 30. The location of the attachment between the expandable portion 14 and the shelf 38 serves to enlarge the available volume of the storage chamber 18 when the same is generated.

Figure 4C:
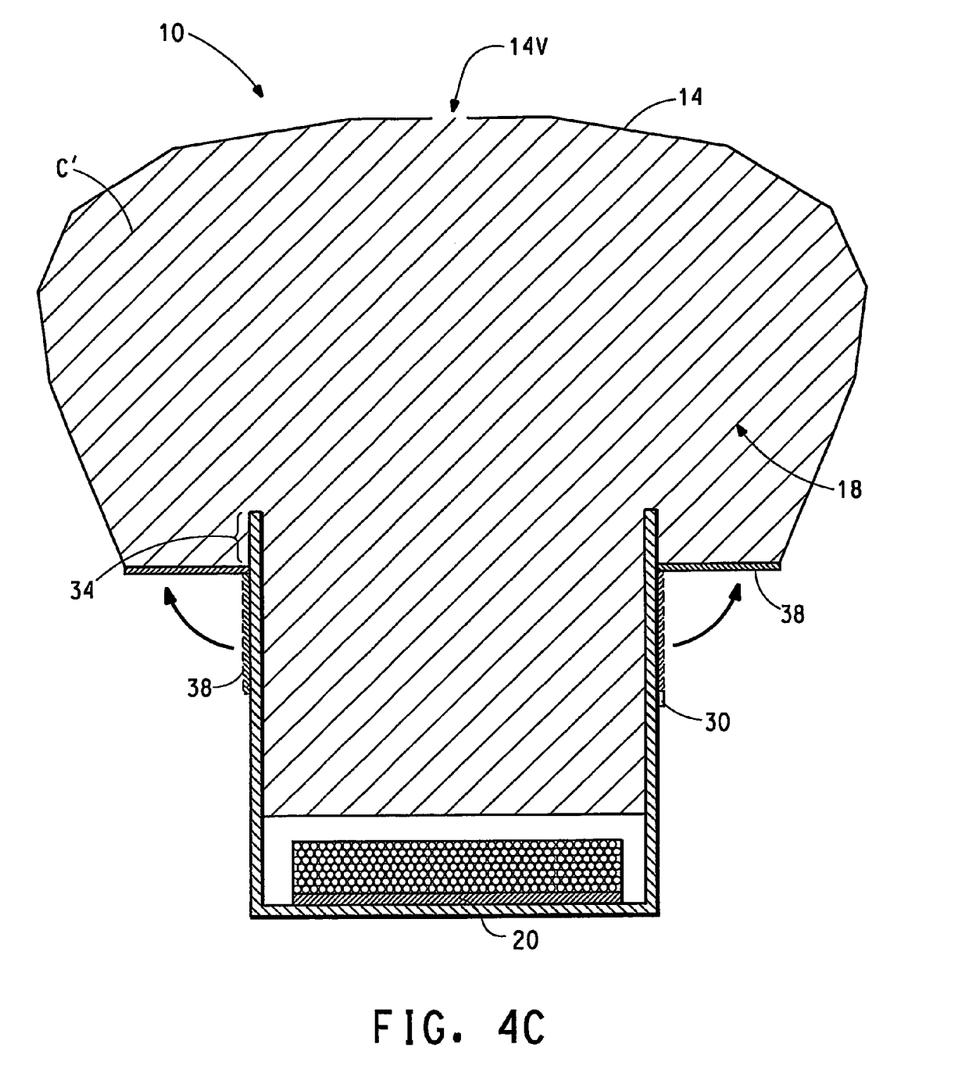
FIG. 4C illustrates an alternative modification.

If it desired that the upper region of the conduit 32 project into the storage chamber 18 (as in FIGS. 2B, 3B) it is necessary only to lower the attachment point of the shelf 38 to the conduit 32. This alternative is illustrated by the extending portion 34 in FIG. 4C.

Figure 5A:
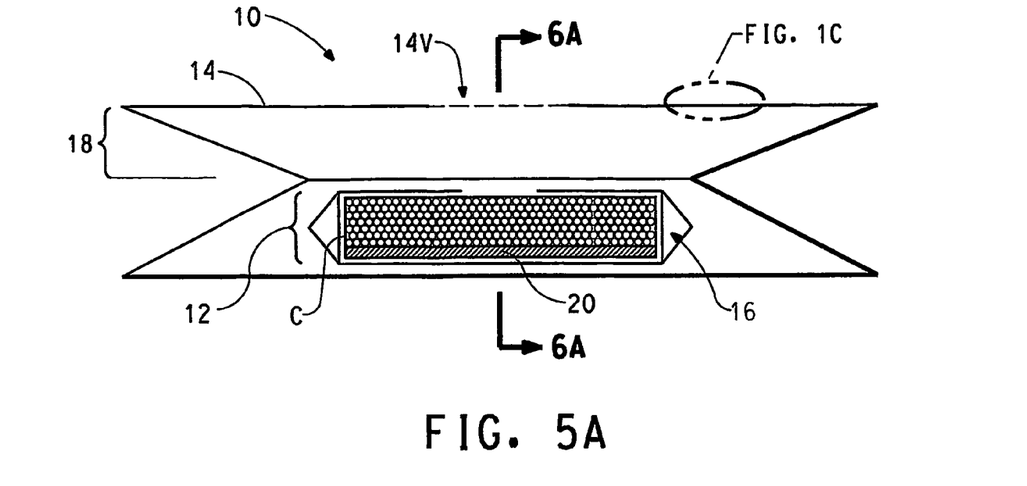
FIGS. 5A and 6A are side elevational views entirely in section of another modified embodiment of a disposable container in accordance with the present invention respectively viewed along orthogonal section lines 5A-5A, 6A-6A prior to the exposure of a comestible article within the container to microwave energy.
Figure 5B:
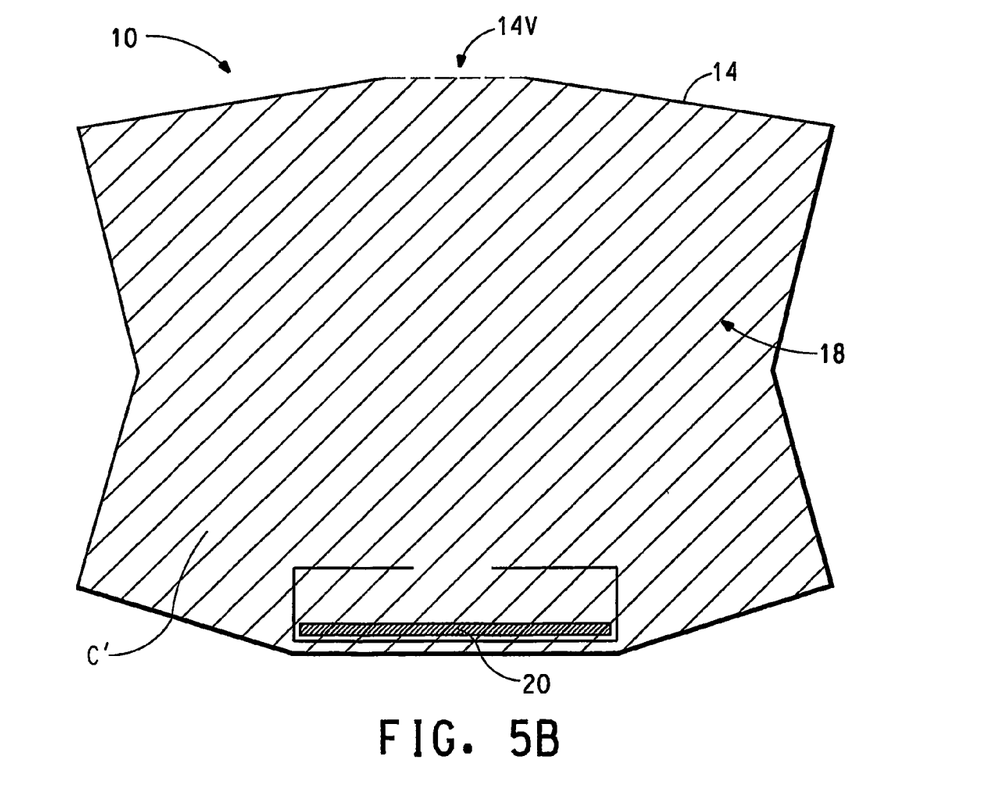
FIGS. 5B and 6B are views respectively corresponding to FIGS. 5A and 6A after exposure of a comestible article within the container to microwave energy.
Figure 6A:
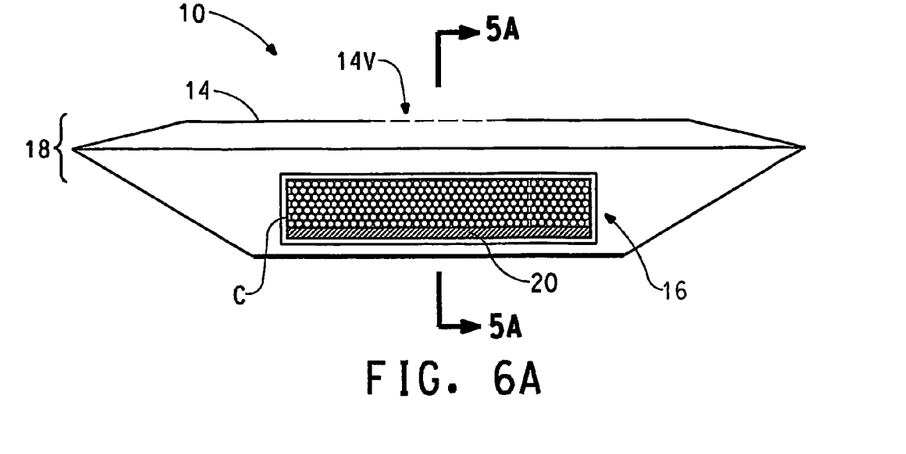
Figure 6B:
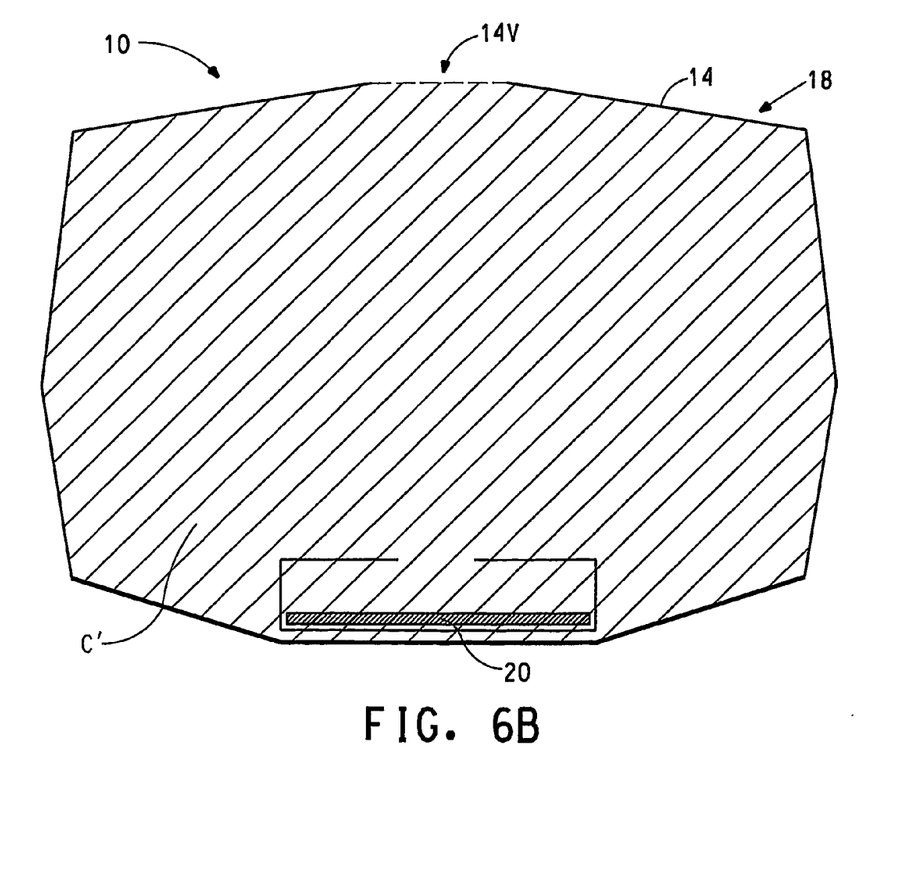

Yet another modification to the container 10 is illustrated in FIGS. 5A and 6A (before exposure to microwave energy) and in FIGS. 5B and 6B (after exposure to microwave energy). In this arrangement the container 10 includes a first portion 12 and a second, expandable, portion 14 in the form of a collapsed folded bag. The first portion 12 defines a preparation chamber 16 in which the comestible material C is disposed. The comestible material C may be positioned on an optional layer of a microwave susceptor 20. The paper support layer 26 of the expandable portion 14 has the shield material 28 coated or laminated onto the interior (or exterior) thereof.

When exposed to microwave energy the comestible material increases in volume and displaces from the preparation chamber 16 into contact with the expandable portion 14, causing the same to enlarge to form the storage chamber 18. A vent 14V may be provided, as discussed in conjunction with FIGS. 1A, 1B.

Figure 7A:
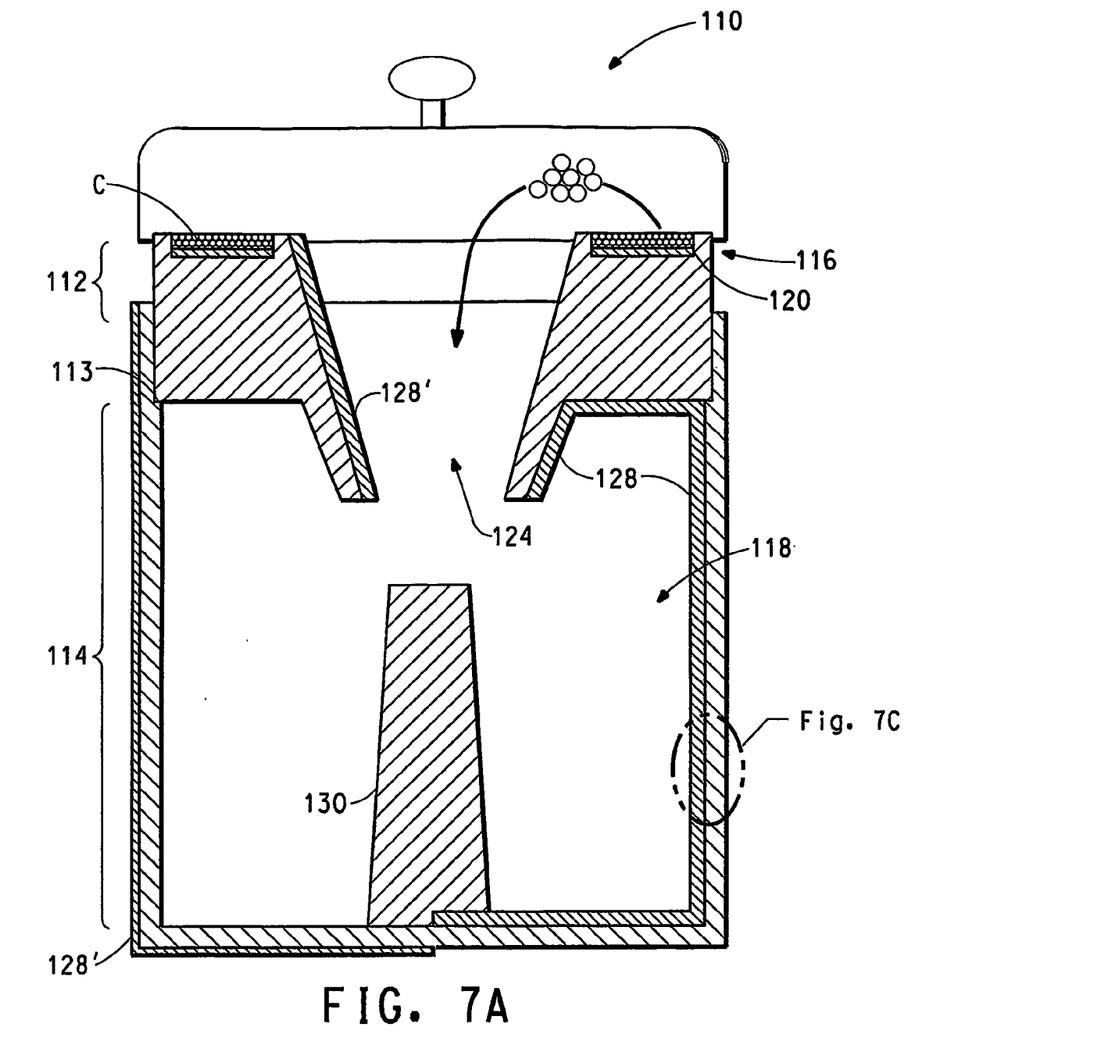
FIGS. 7A and 7B are side elevational views entirely in section of a reusable container in accordance with the present invention before and after exposure of the comestible material to microwave energy, respectively.
Figure 7B:
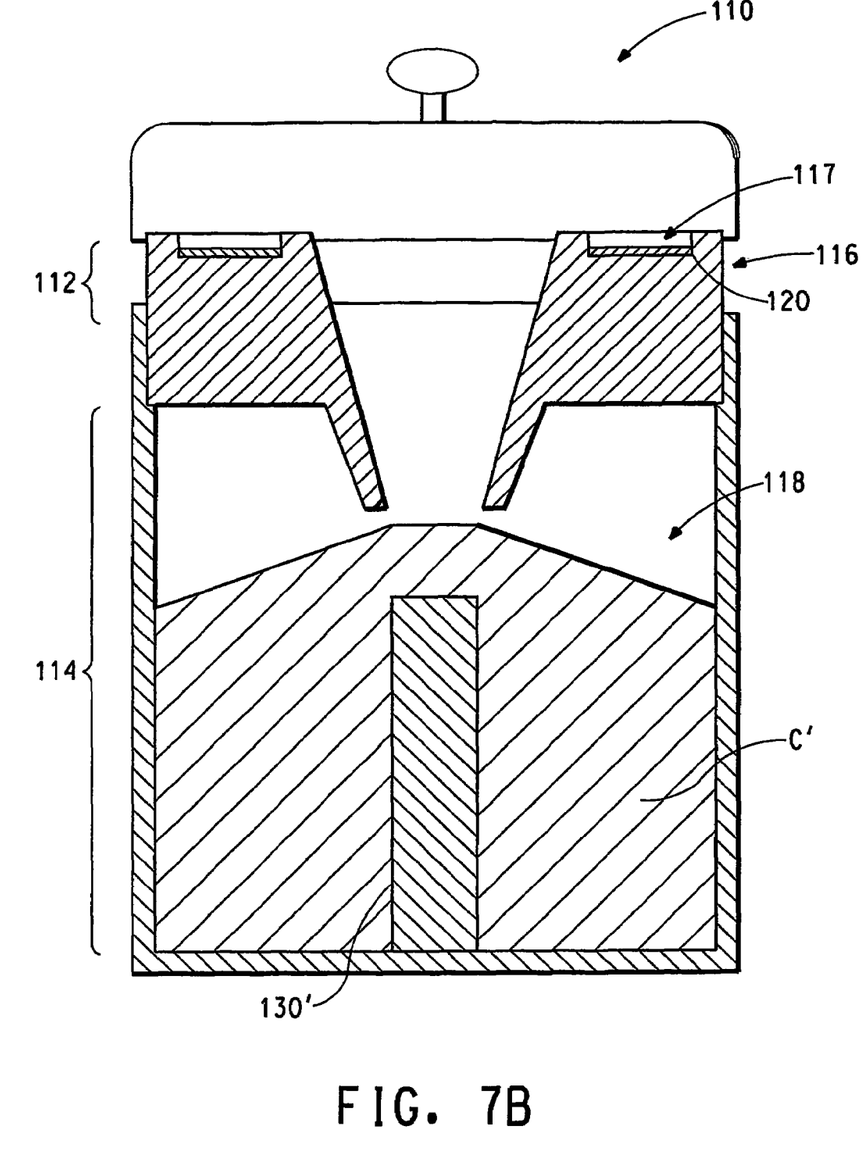

The present invention may also be implemented in the form of a reusable container 110, as illustrated in FIGS. 7A and 7B. The reusable container 110 comprises an upper portion 112 defining a preparation chamber 116 and a lower portion 114 defining a storage chamber 118. The preparation chamber 116 may be connected to or supported by a support member 113. The upper portion 112 of the container defining the preparation chamber 116 is transparent to microwave energy. The preparation chamber 116 may comprise an annular recess 117 (see FIG. 7B) for receiving the comestible material. An optional susceptor 120 may be positioned in the preparation chamber 116.

Figure 7C:
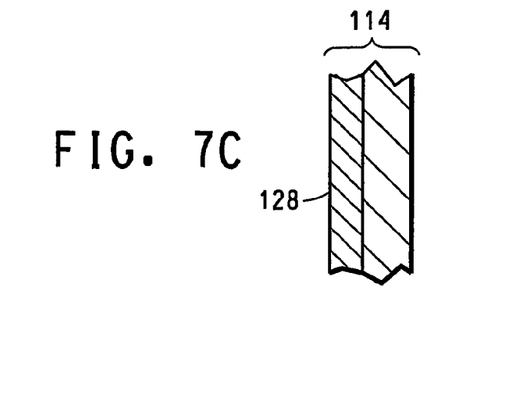
FIG. 7C is enlarged view of a portion of the wall of the reusable container of FIG. 7A.

The lower portion 114 may be constructed of a material that provides an integral shielding function for the storage chamber 118. Alternatively the lower portion 114 may have a shielding material 128 layered thereon. On the right-hand side of FIG. 7A the shielding 128 is shown on the inside of the lower portion 114 (better seen in the enlarged view of FIG. 7C) while on the left-hand side of FIG. 7A the shielding 128' is shown on the outside of the lower portion 114.

A hollow conduit 124 may connect the preparation chamber 116 to the storage chamber 118. The hollow conduit may be tapered as shown and may be configured to attenuate microwave energy thereby to prevent the entry of substantially all the microwave energy into the storage chamber, such as by having a layer of shielding material 128 thereon.

In operation the preparation chamber 116 receives the charge of popcorn C and an edible oil (see FIG. 7A). When the comestible material C initially disposed within the preparation chamber 116 is cooked by exposure to microwave energy the cooked comestible material C' (see FIG. 7B) displaces from the preparation chamber into the storage chamber 118 whereat the cooked comestible material C' is shielded from further exposure to microwave energy by the microwave shielding material 128. A diverter or deflector of a suitable shape 130, 130' may be positioned to divert the cooked comestible material C' and thus distribute it within the storage chamber 118.

What is claimed is:

1. A disposable container for preparing a comestible material in a microwave oven, comprising:
   a first portion of the container defining a preparation chamber,
   a second portion of the container expandable to define a storage chamber,
   at least the portion of the container defining the preparation chamber being transparent to microwave energy,
   the first portion being extended to define a hollow conduit that connects the preparation chamber to the storage chamber,
   wherein the improvement comprises:
      the storage chamber portion of the container and the hollow conduit have a microwave shielding material disposed therearound, wherein the hollow conduit is configured to prevent the entry of substantially all microwave energy into the storage chamber, such that, as a comestible material initially disposed within the preparation chamber is cooked by exposure to microwave energy the comestible material displaces from the preparation chamber into the hollow conduit and then into the storage chamber whereat the comestible material is shielded from further exposure to microwave energy by the microwave shielding material.

2. The disposable container of claim 1, wherein the portion of the container defining the storage chamber is expandable as a comestible material cooked by exposure to microwave energy displaces thereinto.

3. The disposable container of claim 1 wherein the conduit projects into the storage chamber such that the projecting portion of the conduit serves as a barrier that retains the cooked comestible material within the storage chamber.

4. The disposable container of claim 1 wherein the conduit tapers from the preparation chamber toward to the storage chamber.

5. The disposable container of claim 1 further comprising a support base connected to the portion of the container defining the preparation chamber.

6. The disposable container of claim 1 wherein the comestible material is popcorn and wherein the microwave energy causes the popcorn to expand rapidly and thereby to displace from the preparation chamber into the storage chamber.

7. A reusable container for preparing a comestible material in a microwave oven,
   a first portion of the container defining a preparation chamber,
   a second portion of the container defining a storage chamber,
   a hollow conduit able to connect the preparation chamber to the storage chamber,
   at least the portion of the container defining the preparation chamber being transparent to microwave energy,
   wherein the improvement comprises:
      the storage chamber portion of the container and the hollow conduit has a microwave shielding material disposed therearound,
      wherein the hollow conduit is configured to attenuate microwave energy thereby to prevent substantially the entry of microwave energy into the storage chamber, such that, as a comestible material initially disposed within the preparation chamber is cooked by exposure to microwave energy the comestible material displaces from the preparation chamber into the hollow conduit and then into the storage chamber whereat the comestible material is shielded from further exposure to microwave energy by the microwave shielding material.

8. The reusable container of claim 7 further comprising a generally conical shaped diverter disposed within the storage chamber operative to divert comestible material displaced into the storage chamber.

9. The reusable container of claim 7 wherein the comestible material is popcorn and wherein the microwave energy causes the popcorn to expand rapidly and thereby to displace from the preparation chamber into the storage chamber.

10. A self-contained, microwave-preparable comestible article comprising a container and a comestible material wherein
    the container has a first portion defining a preparation chamber and a second portion of the container expandable to define a storage chamber,
    the first portion is extended to define a hollow conduit that connects the preparation chamber to the storage chamber,
    the expandable portion and the hollow conduit have a microwave shielding material,
    the hollow conduit is configured to prevent the entry of substantially all microwave energy into the storage chamber, and
    the comestible material is disposed in the preparation chamber, such that, as a comestible material is cooked by exposure to microwave energy the comestible material displaces from the preparation chamber into the hollow conduit and then into the storage chamber whereat the comestible material is shielded from further exposure to microwave energy by the microwave shielding material.

11. The container of claim 10 wherein the comestible material is popcorn and wherein the microwave energy causes the popcorn to expand rapidly and thereby to displace from the preparation chamber into the storage chamber.

* * * * *